(12) United States Patent
Sassone et al.

(10) Patent No.: US 10,719,325 B2
(45) Date of Patent: Jul. 21, 2020

(54) SYSTEM AND METHOD OF VLIW INSTRUCTION PROCESSING USING REDUCED-WIDTH VLIW PROCESSOR

(71) Applicant: QUALCOMM Incorporated, San Diego, CA (US)

(72) Inventors: Peter Sassone, Austin, TX (US); Christopher Koob, Round Rock, TX (US); Suresh Kumar Venkumahanti, Austin, TX (US)

(73) Assignee: Qualcomm Incorporated, San Diego, CA (US)

( * ) Notice: Subject to any disclaimer, the term of this patent is extended or adjusted under 35 U.S.C. 154(b) by 67 days.

(21) Appl. No.: 15/805,935

(22) Filed: Nov. 7, 2017

(65) Prior Publication Data

US 2019/0138311 A1 May 9, 2019

(51) Int. Cl.
*G06F 9/30* (2018.01)
*G06F 9/38* (2018.01)

(52) U.S. Cl.
CPC .......... *G06F 9/30196* (2013.01); *G06F 9/384* (2013.01); *G06F 9/3822* (2013.01); *G06F 9/3836* (2013.01); *G06F 9/3853* (2013.01); *G06F 9/3855* (2013.01); *G06F 9/3857* (2013.01)

(58) Field of Classification Search
CPC .............................. G06F 9/3853; G06F 9/3889
See application file for complete search history.

(56) References Cited

U.S. PATENT DOCUMENTS

| | | | | |
|---|---|---|---|---|
| 5,974,537 A | * | 10/1999 | Mehra | G06F 9/30072 712/215 |
| 5,996,063 A | | 11/1999 | Gaertner et al. | |
| 6,237,076 B1 | * | 5/2001 | Gaertner | G06F 9/30014 711/202 |
| 6,263,416 B1 | | 7/2001 | Cherabuddi et al. | |
| 6,356,918 B1 | * | 3/2002 | Chuang | G06F 9/3836 |
| 6,405,305 B1 | * | 6/2002 | Meier | G06F 9/30043 708/510 |
| 7,096,343 B1 | * | 8/2006 | Berenbaum | G06F 9/3851 712/215 |
| 7,568,088 B1 | * | 7/2009 | Favor | G06F 9/30094 712/218 |
| 9,405,542 B1 | | 8/2016 | Schuttenberg et al. | |

(Continued)

FOREIGN PATENT DOCUMENTS

WO      2016032643 A1      3/2016

OTHER PUBLICATIONS

International Search Report and Written Opinion—PCT/US2018/059658—ISA/EPO—dated Feb. 18, 2019.

*Primary Examiner* — Michael J Metzger
(74) *Attorney, Agent, or Firm* — Moore IP

(57) ABSTRACT

Very long instruction word (VLIW) instruction processing using a reduced-width processor is disclosed. In a particular embodiment, a VLIW processor includes a control circuit configured to receive a VLIW packet that includes a first number of instructions and to distribute the instructions to a second number of instruction execution paths. The first number is greater than the second number. The VLIW processor also includes physical registers configured to store results of executing the instructions and a register renaming circuit that is coupled to the control circuit.

20 Claims, 7 Drawing Sheets

(56) References Cited

U.S. PATENT DOCUMENTS

| | | | |
|---|---|---|---|
| 9,612,840 B2 | 4/2017 | Khartikov et al. | |
| 9,690,583 B2 | 6/2017 | Gschwind et al. | |
| 9,710,272 B2 | 7/2017 | Wilson et al. | |
| 2004/0268098 A1* | 12/2004 | Almog | G06F 9/3808 712/227 |
| 2005/0005085 A1* | 1/2005 | Miyanaga | G06N 3/126 712/32 |
| 2007/0083736 A1* | 4/2007 | Baktha | G06F 9/3836 712/215 |
| 2009/0049276 A1* | 2/2009 | Bergland | G06F 9/30036 712/24 |
| 2009/0077354 A1* | 3/2009 | Rangan | G06F 9/30072 712/224 |
| 2009/0164753 A1* | 6/2009 | Jungwirth | G06F 9/30058 712/24 |
| 2011/0219212 A1* | 9/2011 | Codrescu | G06F 9/30149 712/208 |
| 2014/0281368 A1* | 9/2014 | Ingle | G06F 9/3853 712/4 |
| 2015/0277916 A1* | 10/2015 | Khartikov | G06F 9/30145 712/205 |
| 2016/0335092 A1 | 11/2016 | Jacob | |
| 2016/0378481 A1 | 12/2016 | Leijten | |
| 2017/0132010 A1* | 5/2017 | Vasekin | G06F 9/3855 |

* cited by examiner

SYSTEM AND METHOD OF VLIW INSTRUCTION PROCESSING USING REDUCED-WIDTH VLIW PROCESSOR

I. FIELD

The present disclosure is generally related to processors, and more specifically related to very long instruction word (VLIW) processors.

II. DESCRIPTION OF RELATED ART

Advances in technology have resulted in more powerful computing devices. For example, computing devices such as laptop and desktop computers and servers, as well as wireless computing devices such as portable wireless telephones, have improved computing capabilities and are able to perform increasingly complex operations. Increased computing capabilities have also enhanced device capabilities in various other applications. For example, vehicles may include processing devices to enable global positioning system operations or other location operations, self-driving operations, interactive communication and entertainment operations, etc. Other examples include household appliances, security cameras, metering equipment, etc., that also incorporate computing devices to enable enhanced functionality, such as communication between internet-of-things (IoT) devices.

A computing device may include a processor to execute program instructions. For example, a computing device may include a very long instruction word (VLIW) processor that processes VLIW packets (also referred to as longwords) of multiple instructions. Each instruction may designate a particular register into which a result of executing the instruction is to be stored. Storing the result of executing the instruction into the designated register is referred to as a "commit" of the instruction that can alter the state of the designated register. The instructions within a VLIW packet are to be committed atomically (i.e., the results of executing all the instructions of a particular VLIW packet are stored in their respective designated registers when all instructions execute successfully). If any one of the instructions of a VLIW packet cannot be committed (e.g., executing the instruction causes an exception, such as a divide by zero exception), then none of the instructions of the packet are committed. Thus, the states of the designated registers are not altered until the processor has verified that all instructions execute successfully.

VLIW processors include at least as many parallel execution paths as the VLIW packet size to ensure that all instructions in a received VLIW packet are executed in parallel and are committed or aborted as an atomic group. Although implementing multiple parallel processing paths enables high throughput operation, the multiple parallel processing paths may also increase cost, size, and power consumption of the VLIW processor as compared to a processor having fewer processing paths.

III. SUMMARY

In a particular aspect, a very long instruction word (VLIW) processor includes a control circuit configured to receive a VLIW packet that includes a first number of instructions and to distribute the instructions to a second number of instruction execution paths. The first number is greater than the second number. The VLIW processor includes physical registers configured to store results of executing the instructions. The VLIW processor also includes a register renaming circuit coupled to the control circuit.

In another aspect, a method of operating a processor includes receiving, at a processor that includes a second number of instruction execution paths, a packet that includes a first number of instructions that are to be committed atomically at the processor. The first number is greater than the second number. The method includes executing a first instruction of the packet during a first time period. The method also includes writing a result of executing the first instruction to a first register. The method further includes, after executing a second instruction of the packet during a second time period that is after the first time period, indicating that the first register is an instruction set defined register.

In another aspect, an apparatus includes means for storing an instruction execution result. The apparatus includes means for distributing instructions of a VLIW packet to a second number of means for executing instructions. The second number is less than a first number of the instructions in the VLIW packet. The apparatus also includes means for renaming the means for storing.

In another aspect, a non-transitory computer readable medium stores instructions that are executable by a processor to cause the processor to perform operations. The operations include receiving a packet that includes a first number of instructions that are to be committed atomically at the processor. The first number is greater than a second number of instruction execution paths of the processor. The operations include executing a first instruction of the packet during a first time period. The operations also include writing a result of executing the first instruction to a first register and, after executing a second instruction of the packet during a second time period that is after the first time period, indicating that the first register is an instruction set defined register.

One particular advantage provided by at least one of the disclosed aspects is execution of VLIW instructions by a processor having a processor width (e.g., number of execution paths) that is smaller than the number of instructions in each VLIW packets, enabling reduced processor cost, area, and power consumption as compared to processors having greater width, while retaining compatibility with existing VLIW code and compilers. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
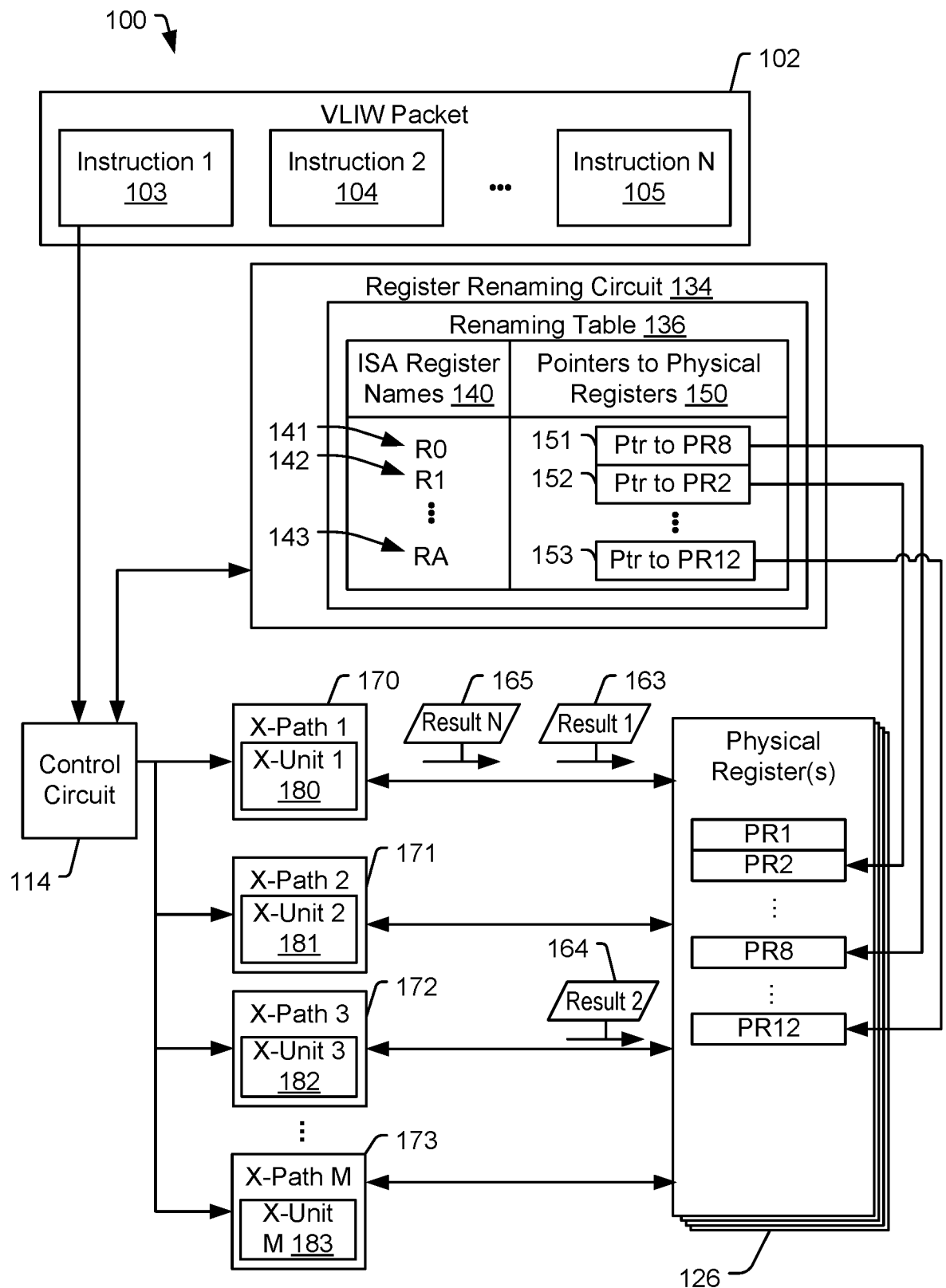
FIG. 1 is a block diagram of a particular implementation of a processor configured to execute instructions of a VLIW packet and that includes fewer execution paths than the number of instructions in the VLIW packet.

FIG. 1 depicts a VLIW processor 100 configured to execute instructions of a VLIW packet 102 and that includes fewer execution paths than the number of instructions that are in the VLIW packet 102. The processor 100 includes a control circuit 114 coupled to one or more instruction execution paths, illustrated as a first execution path 170 that includes a first execution unit 180, a second execution path 171 that includes a second execution unit 181, a third execution path 172 that includes a third execution unit 182, and an Mth execution path 173 that includes an Mth execution unit 183 (M is a positive integer). In a particular implementation, each of the execution units 180-183 includes arithmetic computation circuitry such as an arithmetic logic unit (ALU), address computation circuitry such as an address generation unit (AGU), floating-point computation circuitry such as a floating-point unit (FPU), load-store circuitry such as a load-store unit, other circuitry, or any combination thereof. Although four execution paths are illustrated, corresponding to M=4, in other implementations M has other values, such as M=1, M=2, M=3, M=5, or M>5. Instructions may be executed in parallel at the execution paths 170-173. For example, when M=4, up to four instructions may be executed in parallel via the four instruction execution paths 170-173.

The execution paths 170-173 are coupled to physical registers 126. The physical registers 126 include representative physical registers PR1, PR2, PR8, and PR12, although any number of physical registers (e.g., more than 12) may be included. The execution paths 170-173 are configured to store results of instruction execution into the physical registers 126. For example, each execution path 170-173 may include one or more buffers, driver circuits, and control circuitry configured to transfer an instruction execution result into an identified physical register for storage. In some implementations, multiple physical registers are used for storing result(s) of executing a single instruction. In an illustrative example, an instruction generates multiple results that are stored in separate registers. In another illustrative example, an instruction generates a result (e.g., a double-precision value) that is larger than a single physical register and that is segmented into multiple portions for storage into multiple physical registers.

A register renaming circuit 134 is coupled to the control circuit 114 and to the physical registers 126. The register renaming circuit 134 is configured to indicate that registers of the physical registers 126 are instruction set defined registers (also referred to as "architected registers"). The register renaming circuit 134 includes a renaming table 136 configured to map instruction set defined register names 140 to particular registers of the physical registers 126 via pointers 150. For example, the renaming table 136 illustrates that a first architected register (R0) 141 is associated with a pointer 151 that maps R0 to physical register PR8, a second architected register (R1) 142 is associated with a pointer 152 that maps R2 to physical register PR2, and an Ath architected register (RA) 143 is associated with a pointer 153 that maps RA to physical register PR12 (A is a positive integer).

The control circuit 114 is configured to receive VLIW packets that include multiple instructions and to distribute the multiple instructions to one or more of the instruction execution paths 170-173. For example, the control circuit 114 is configured to receive the VLIW packet 102 that includes N instructions 103-105 (N is a positive integer greater than M) and to distribute the N instructions 103-105 to the execution paths 170-173. Distributing the instructions can include scheduling two of the instructions 103-105 to be executed in the same instruction execution path. For example, the control circuit 114 may cause the first instruction 103 to be executed at the first execution unit 180 during a first time period and the second instruction 104 to be executed at the first execution unit 180 during a second time period that is after the first time period. Examples of "breaking" the VLIW packet 102 to execute instructions over multiple time periods are described in further detail with reference to FIGS. 3-6.

As an illustrative example, the VLIW packet 102 is received during a time period T0, the first instruction 103 designates that a result of executing the first instruction 103 is to be written into the instruction set defined register R1, the second instruction 104 designates that a result of executing the second instruction 104 is to be written into the instruction set defined register RA, and the Nth instruction 105 designates that a result of executing the Nth instruction 105 is to be written into the instruction set defined register R0. The first instruction 103 is executed at the first execution unit 180 during a first time period T1 and the first execution path 170 is configured to store a first committable result 163 of execution of the first instruction 103 to PR2 (one of the physical registers 126) during T1. Also during T1, the second instruction 104 is executed at the third execution unit 182 and a result 164 of executing the second instruction 104 is written to PR12. After executing the Nth instruction 105 at the first execution unit 180 during a second time period T2 that is after T1 (either immediately after or following an intervening time period), the first execution path 170 writes a result 165 of the Nth instruction 105 to PR8.

In response to execution, by the first execution path 170, of the Nth instruction 105 resulting in the second committable result 165, and after the result of each of the instructions 103-105 is written into a respective physical register, the register renaming circuit 134 is configured to indicate that the registers PR8, PR2, and PR12 are architected registers. For example, the register renaming circuit 134 may initiate an atomic commit operation that includes updating pointers 151, 152, and 153 of the renaming table 136 to indicate the registers PR8, PR2, and PR12 are the instruction set defined registers R0, R1, and RA, respectively. Next executed instructions that access (e.g., read values from) one or more of R0, R1, and RA are directed to PR8, PR2, and PR12, respectively, via the renaming table 136.

Updating the pointers is performed as part of a renaming table update operation in response to determining that execution of each of the multiple instructions 103-105 of the VLIW packet 102 has generated a committable result (e.g., has completed without triggering an exception). The renaming table update operation includes updating multiple pointers of the renaming table 136 to indicate that registers storing the committable results are instruction set defined registers. Thus, instruction execution results are stored in the physical registers until all of the instructions 103-105 have executed, and thereafter the instructions 103-105 are committed via the renaming table update operation. By updating the renaming table 136 rather than copying results from the physical registers to dedicated architected registers, power consumption associated with a "double write" of data, including writing results to the physical registers and then copying the results to architected registers, may be avoided.

Use of register renaming enables the VLIW processor 100 to have a number of instruction execution paths that is less than the number of instruction "slots" in the VLIW packet 102 (e.g., M<N). As a result, VLIW instructions may be executed without modifying VLIW packets and at a reduced-cost or lower-power processor that has fewer instruction execution paths, as compared to processors having a number of execution paths that equals or exceeds the number of VLIW instructions (e.g., M≥N). Use of register renaming also enables the VLIW processor 100 to perform out-of-order execution. To illustrate, a second VLIW packet that includes multiple instructions (including a third instruction) may be received during the time period T1, and the third instruction may be executed during a time period that is before the second time period T2 (e.g., before the final instruction of the VLIW packet 102 is executed), as described further with reference to FIG. 5.

In some implementations, use of register renaming enables the processor 100 to support microcode that translates one or more of the instructions 103-105 into multiple hardware-level sub-instructions. For example, the processor 100 may have a low-power design without specialized integer divide hardware, and an integer divide instruction received in the VLIW packet 102 may be executed by replacing the integer divide instruction with a sequence of sub-instructions to emulate integer division. The processor 100 may execute each of the multiple sub-instructions prior to updating the renaming table 136 to commit results of the instruction atomically with the other instructions of the packet 102. Further examples including microcode are described with reference to FIG. 2 and FIG. 6.

Figure 2:
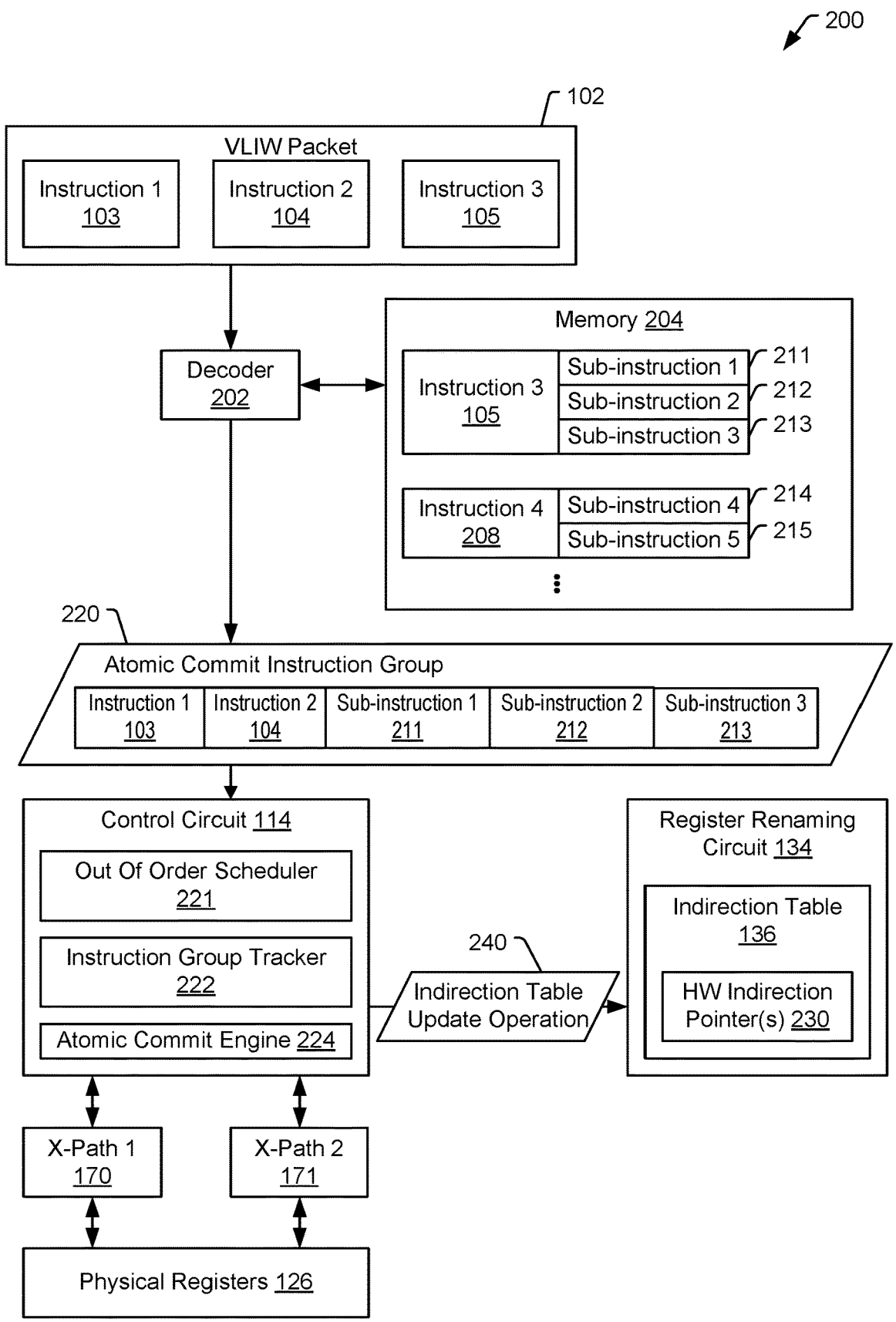
FIG. 2 is a block diagram illustrating a particular implementation of components of the processor of FIG. 1.

Referring to FIG. 2, a particular implementation of the processor 100 of FIG. 1 having two execution paths is depicted and designated 200. The VLIW packet 102 is illustrated as including three instructions (i.e., N=3). The VLIW packet 102 is received at a decoder 202 that is coupled to a memory 204. The memory 204 includes information regarding translating instructions into groups of sub-instructions (e.g., microcode). For example, the memory 204 includes data to cause the decoder 202 to substitute the third instruction 105 with a group of sub-instructions including a first sub-instruction 211, a second sub-instruction 212, and a third sub-instruction 213. The memory 204 also includes data to cause the decoder 202 to map a fourth instruction 208 into a group of sub-instructions including a fourth sub-instruction 214 and a fifth sub-instruction 215.

The decoder 202 is configured to detect one or more instructions in the VLIW packet 102 that have associated sub-instructions in the memory 204 and to replace such instructions with the corresponding sub-instructions. For example, as illustrated, the decoder 202 accesses the memory 204 to replace the third instruction 105 of the VLIW packet 102 with the sub-instructions 211-213 to form an atomic commit instruction group 220. The atomic commit instruction group 220 includes the first instruction 103, the second instruction 104, the first sub-instruction 211, the second sub-instruction 212, and the third sub-instruction 213.

The control circuit 114 is configured to distribute instructions and sub-instructions of the atomic commit instruction group 220 to one or more of the execution paths: the first execution path (XP1) 170 and the second execution path (XP2) 171. The control circuit 114 includes an out of order scheduler 221, an instruction group tracker 222, and an atomic commit engine 224. The out of order scheduler 221 is configured to schedule and route individual instructions and sub-instructions of each received atomic commit instruction group to the execution paths 170-171. The out of order scheduler 221 is configured to "break" the VLIW packet 102 such that individual instructions or sub-instructions corresponding to the VLIW packet 102 are executed over multiple time periods. Examples of out of order scheduling that may be performed by the out of order scheduler 221 are illustrated in further detail with reference to FIGS. 3-6.

The instruction group tracker 222 is configured to maintain information corresponding to instructions and sub-instructions, if any, of each received atomic commit instruction group. For example, the instruction group tracker 222 is configured to maintain information regarding execution status of each of the instructions 103, 104 and each of the sub-instructions 211, 212, and 213 of the atomic commit instruction group 220. Upon successful execution of each of the instructions and sub-instructions of the atomic commit instruction group 220, the instruction group tracker 222 updates a status indicator to indicate whether a committable result is obtained or whether an interrupt has been generated. The instruction group tracker 222 may record information indicating which of the physical registers 126 store results corresponding to which of the instructions or sub-instructions of the atomic commit instruction group 220. The instruction group tracker 222 is accessible by the atomic commit engine 224 to provide information corresponding to committable instruction execution results.

The atomic commit engine 224 is configured to detect when an atomic commit instruction group has completed execution with committable results. For example, in some implementations the atomic commit engine 224 is configured to detect when each of the instructions 103, 104 and the sub-instructions 211, 212, and 213 have generated committable results that have been stored in particular physical registers 126. In some implementations, the atomic commit engine 224 is further configured to determine that the atomic commit instruction group 220 is an oldest atomic commit instruction group at the processor (e.g., all VLIW packets received at the out of order scheduler 221 prior to the VLIW packet 102 have been executed and either committed or aborted). In response to determining that the instructions 103, 104 and the sub-instructions 211, 212, and 213 have committable results, the atomic commit engine 224 may initiate an indirection table update operation 240 at the register renaming circuit 134.

The register renaming circuit 134 includes the renaming table 136 implemented as an indirection table that includes hardware indirection pointers 230. For example, each of the pointers 151-153 of FIG. 1 may be implemented by a hardware indirection pointer to map architected registers to specific physical registers of the physical registers 126. The register renaming circuit 134 is responsive to the atomic commit engine 224 to perform the indirection table update operation 240. For example, the indirection table update operation 240 may cause the register renaming circuit 134 to update the indirection table 136 by updating each of the hardware indirection pointers 230 that corresponds to architected registers that are designated by the instructions 103-105 to point to the physical registers into which committable results of the atomic commit instruction group 220 have been stored.

In a particular implementation, a hardware indirection pointer update is performed as part of the indirection table update operation 240 in response to determining that execution of each of the multiple instructions 103-105 of the VLIW packet 102 (i.e., each of the instructions 103 and 104 and each of the sub-instructions 211, 212, and 213 of the atomic commit instruction group 220) has generated a committable result (e.g., has completed without triggering an exception). The indirection table update operation 240 includes updating multiple hardware indirection pointers to indicate that registers storing the committable results are instruction set defined registers. Thus, instruction execution results are stored in the physical registers until all of the instructions 103, 104 and the sub-instructions 211, 212, and 213 have executed and thereafter the results are committed via the indirection table update operation 240.

By updating the renaming table 136 rather than copying results from the physical registers to dedicated architected registers, power consumption associated with copying data from a temporary physical register to a separate architected register may be avoided. Further, translating instructions to groups of sub-instructions enables the processor 100 to support the instruction set of the VLIW packet 102 without including dedicated components to process every instruction of the instruction set. In an illustrative example, the instruction 105 is an integer divide instruction or a string copy instruction, and the processor 100 executes the sub-instructions 211, 212, and 213 to generate a result of the instruction 105 without including a dedicated integer division circuit or a dedicated string copy circuit, respectively. Thus, the processor 100 supports the instruction set of the VLIW packet 102 at reduced cost and processor size as compared to a processor that includes specialized circuity to support execution of instructions without using microcode.

Figure 3:
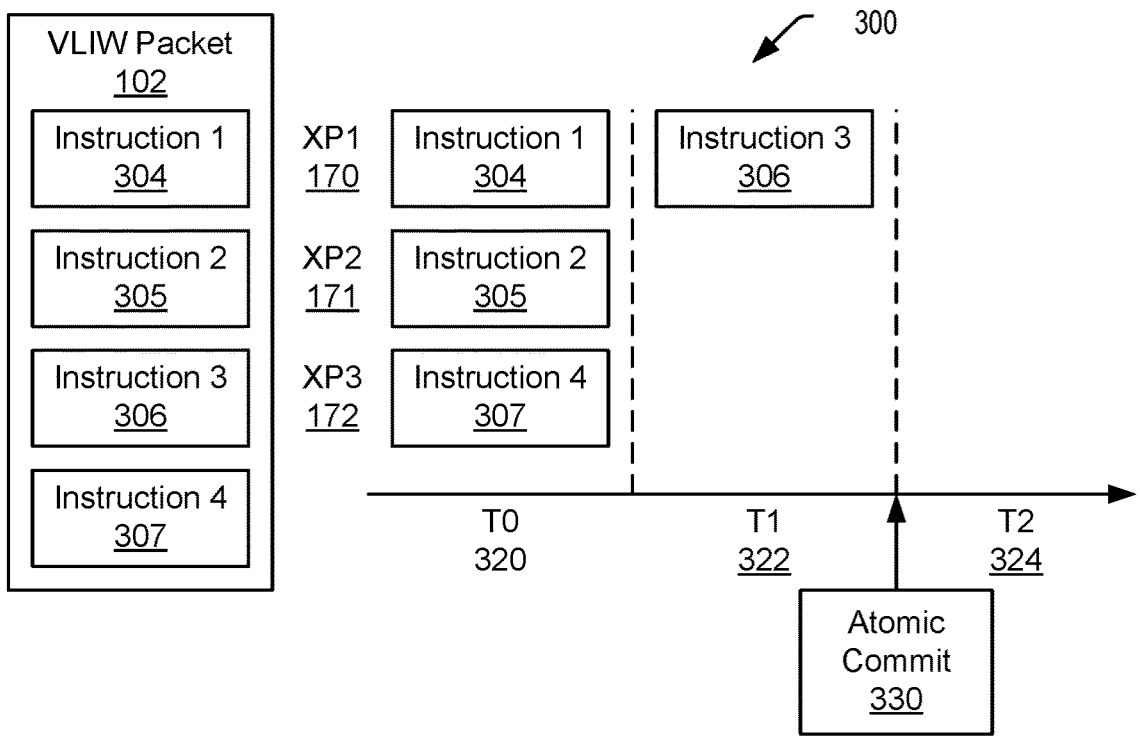
FIG. 3 is a timing diagram of a particular implementation of processing a VLIW packet during multiple time periods.

Referring to FIG. 3, a timing diagram 300 illustrates an example of execution of instructions of the VLIW packet 102 in an implementation in which the processor 100 has three execution paths and the VLIW packet 102 has four instructions. As illustrated, the VLIW packet 102 includes a first instruction 304, a second instruction 305, a third instruction 306, and a fourth instruction 307, and the processor 100 includes the first execution path (XP1) 170, the second execution path (XP2) 171, and the third execution path (XP3) 172.

During a first time period (T0) 320, the processor 100 executes the first instruction 304 at the first execution path 170, the second instruction 305 at the second execution path 171, and the fourth instruction 307 at the third execution path 172. In response to execution of the instructions 304, 305, and 307 generating committable results, the results are stored in physical registers. During a second time period (T1) 322 that follows the first time period 320, the third instruction 306 is executed at the first execution path 170 and a committable result of execution of the third instruction 306 is stored into a physical register. After completion of execution of the third instruction 306, each of the instructions of the VLIW packet 102 has been executed and the results have been stored into respective physical registers. Thus, an atomic commit operation 330 may be performed upon the completion of the second time period 322, such as during a third time period (T2) 324 that follows the second time period 322. To illustrate, the atomic commit 330 may include the indirection table update operation 240 of FIG. 2.

Breaking up the VLIW packet 102 and executing the instructions 304-307 during two time periods enables the processor 100 to support execution and atomic commit of the instructions of the VLIW packet 102 using a processor architecture that has fewer execution paths than the number of instructions in the VLIW packet 102. Thus, the processor 100 provides a reduced cost, reduced power consumption, and smaller area as compared to an implementation of a VLIW processor that has a dedicated execution path for each instruction slot of the VLIW packet 102.

Figure 4:
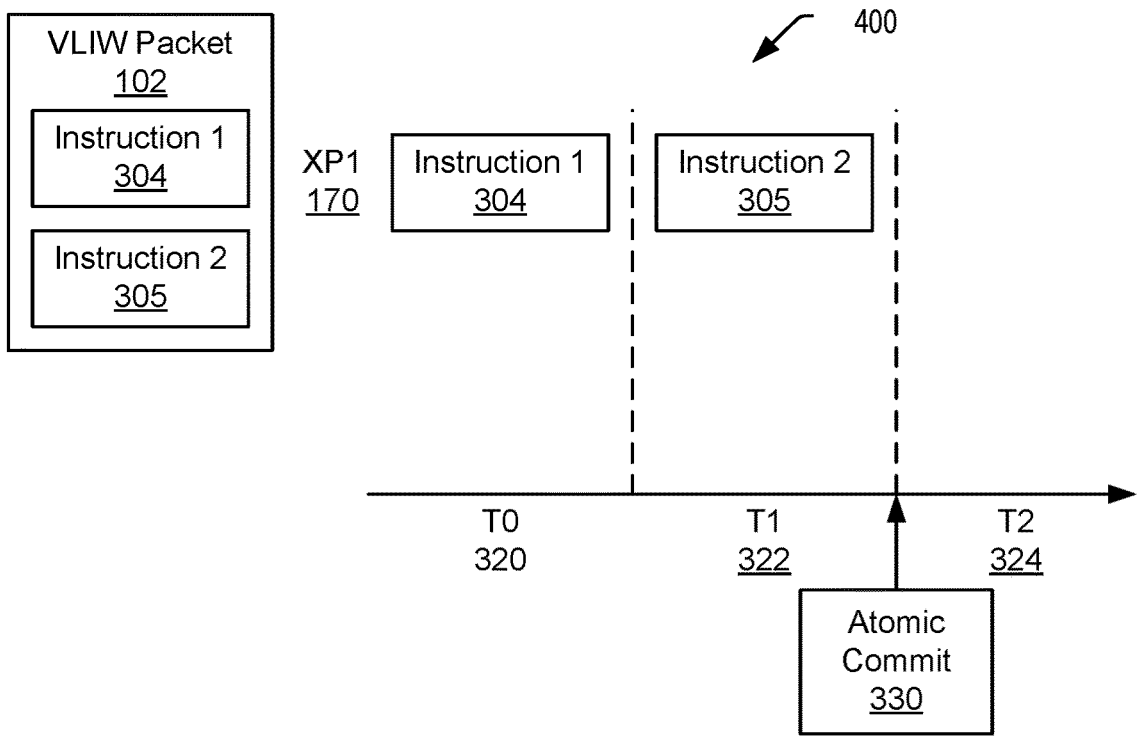
FIG. 4 is a timing diagram of another implementation of processing a VLIW packet during multiple time periods.

FIG. 4 depicts a timing diagram 400 of an implementation in which the processor 100 has a single execution path (the first execution path 170) and the VLIW packet 102 has two instructions: the first instruction 304 and the second instruction 305.

The first instruction 304 is executed in the first execution path 170 during the first time period 320, and the second instruction 305 is executed in the first execution path 170 during the second time period 322. After successful execution of both of the instructions 304, 305 of VLIW packet 102, the atomic commit operation 330 may be performed (e.g., at the end of the second time period 322). Thus, the VLIW packet 102 can be executed in an implementation of the processor 100 that has a single execution path (i.e., M=1) for further reduced cost, reduced power consumption, and smaller area as compared to the implementation of the processor 100 of FIG. 3. Although FIG. 4 depicts the VLIW packet 102 as including two instructions (i.e., N=2), in other implementations the VLIW packet 102 includes a larger number of instructions (e.g., N>2).

Figure 5:
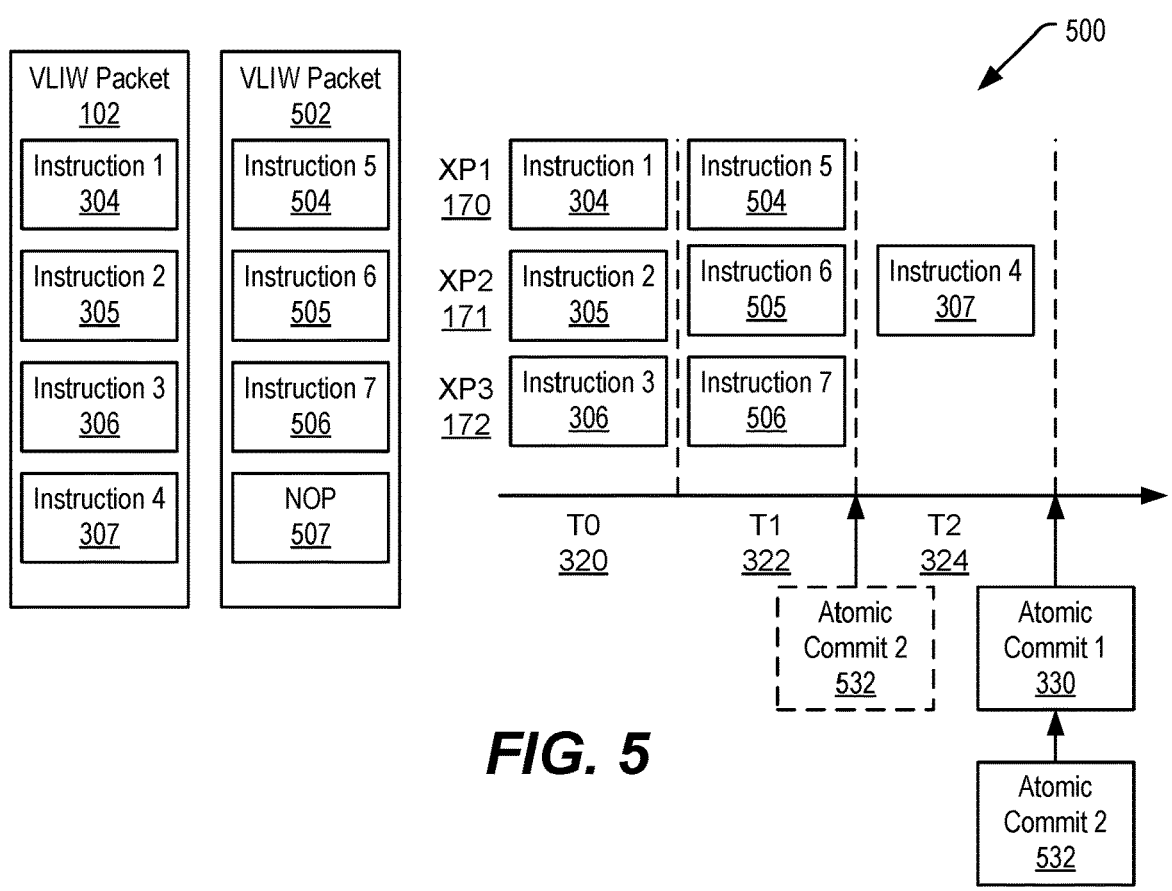
FIG. 5 is a timing diagram of another implementation of processing a VLIW packet during multiple time periods.

FIG. 5 depicts a timing diagram 500 of an implementation in which the processor 100 has three execution paths 170-172 and the VLIW packet 102 has four instructions 304-307. The VLIW packet 102 may be received at a time prior to time T0 320, and the first instruction 304, the second instruction 305, and third instruction 306 may be executed during the first time period 320. Also during the first time period 320, a second VLIW packet 502 may be received and prepared for execution (e.g., decoded, scheduled, etc.).

The VLIW packet 502 includes a fifth instruction 504, a sixth instruction 505, and a seventh instruction 506. Although the VLIW packet 502 is configured to include four instructions, one instruction "slot" is replaced with a no operation (NOP) placeholder 507. During the second time period 322, the fifth instruction 504, the sixth instruction 505, and the seventh instruction 506 of the second VLIW packet 502 are executed.

After successful execution of each of the instructions 504-506 during the second time period 322, the atomic commit 532 of all instructions corresponding to the second VLIW packet 502 may be performed. However, in an implementation in which the processor 100 is constrained to commit VLIW packets in the order in which they are received, the instructions of the second VLIW packet 502 may not be committed prior to the instructions of the first VLIW packet 102 being committed.

The fourth instruction 307 of the first VLIW packet 102 may be executed during the third time period 324. In some examples, the fourth instruction 307 is not available for execution during the second time period 322, such as due to a delay caused by a branch misprediction or off-chip memory access, as illustrative, non-limiting examples. In other examples, the fourth instruction 307 is available for execution during the second time period 322 but is scheduled for execution during the third period 324 by the out of order scheduler 221 for one or more other reasons, such as to reduce peak power consumption during the second time period 322.

After successful execution of each of the instructions 304-306 during the first time period 320 and the fourth instruction 307 during the third time period 324, a first atomic commit operation 330 may be performed to commit the VLIW packet 102, and a second atomic commit operation 532 may be performed after, or concurrently with, performance of the first atomic commit operation 330. The second atomic commit operation 532 corresponds to committing the instructions 504-506 of the second VLIW packet 502.

Thus, FIG. 5 depicts an implementation in which the second VLIW packet 502 is received after the first VLIW packet 102 and includes a group of instructions 504-506 that are to be committed atomically at the processor 100. One or more of the instructions 504-506 are executed prior to completion of executions of the first VLIW packet 102 (e.g., the first VLIW packet 102 is "broken" and instructions are executed out of order between packets). Thus, one or more instructions of the second VLIW packet 502 is executed during the time period 322, prior to the time period 324 during which the final instruction of the first VLIW packet 102 is executed.

By reordering execution of the instructions of the VLIW packets 102 and 502, the processor 100 may improve throughput by reducing stalls or delays in the execution paths 310-314 as compared to implementations in which each VLIW packet is executed in a program order. Although FIG. 5 depicts an implementation in which the processor 100 is constrained from committing the instructions of the VLIW packet 502 until the previous VLIW packet 102 has been committed, in other implementations the processor 100 may include circuitry configured to determine whether one or more dependencies actually exist between the instructions of the first VLIW packet 102 and instructions of the second VLIW packet 502 and to perform the second atomic commit operation 532 prior to, or concurrently with, performing the first atomic commit operation 330 in response to determining that no data dependencies are affected by the order of the commit operations 330-532.

Figure 6:
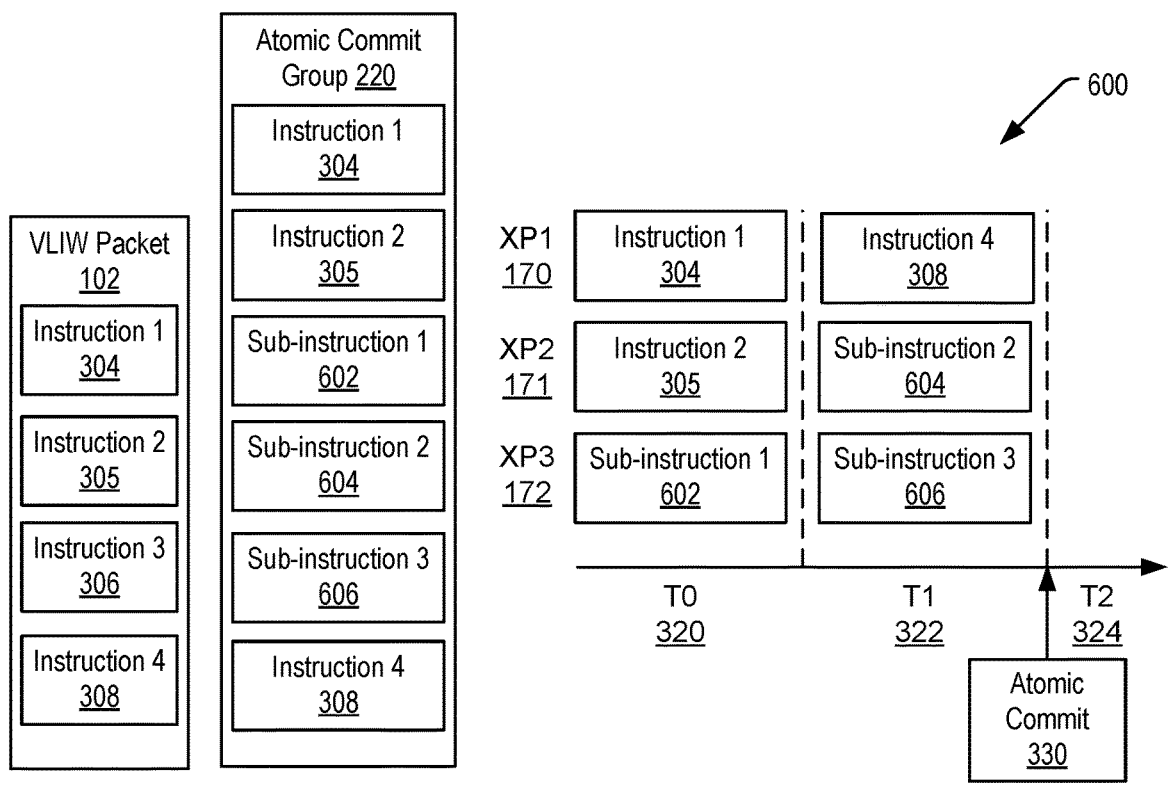
FIG. 6 is a timing diagram of another implementation of processing a VLIW packet during multiple time periods.

FIG. 6 depicts a timing diagram 600 of an implementation of the processor 100 in which the processor 100 has three execution paths 170-172 and the VLIW packet 102 includes four instructions 304-308. In the implementation depicted in FIG. 6, the VLIW packet 102 is processed to generate a particular implementation of the atomic commit group 220 described with reference to FIG. 2. In particular, the third instruction 306 is decoded and replaced with the group of sub-instructions 602, 604, and 606 which are included in the atomic commit group 220 in addition to the first instruction 304, the second instruction 305, and the fourth instruction 308. Thus, the atomic commit group 220 includes a larger number of combined instructions and sub-instructions to be executed and committed atomically than the initial number of instructions in the VLIW packet 102. The first instruction 304, the second instruction 305, and the first sub-instruction 602 are executed during the first time period 320, and the fourth instruction 308, the second sub-instruction 604, and the third sub-instruction 606 are executed during the second time period 322. After completion of each of the instructions 304, 305, and 308, and each of the sub-instructions 602, 604, and 606 of the atomic commit group 220, an atomic commit operation 330 may be performed.

Translating the third instruction 306 to the sub-instructions 306-308 enables the processor 100 to support the instruction set of the VLIW packet 102 without including dedicated components to process the third instruction 306 (e.g., an integer divide instruction) to enable reduced cost and power consumption as compared to implementations of the processor 100 that include specialized hardware to execute the instruction 306 without microcode.

Although FIGS. 3-6 depict particular examples of executing instructions of the VLIW packet 102 during two or more of the time periods 320-324, it should be understood that the instructions may be executed in different orders, during more than two or three time periods, or any combination thereof. For example, in an alternative implementation to that of FIG. 4, the second instruction 305 is executed during the first time period 320, and the first instruction 304 is executed during the second time period 322. Because in some implementations the VLIW packet 102 includes instructions that are selected to be executable in parallel with each other (e.g., arranged into packets by a VLIW compiler), no data dependencies exist between the instructions 304, 305 that would interfere with a sequential execution of the instructions in either order.

Figure 7:
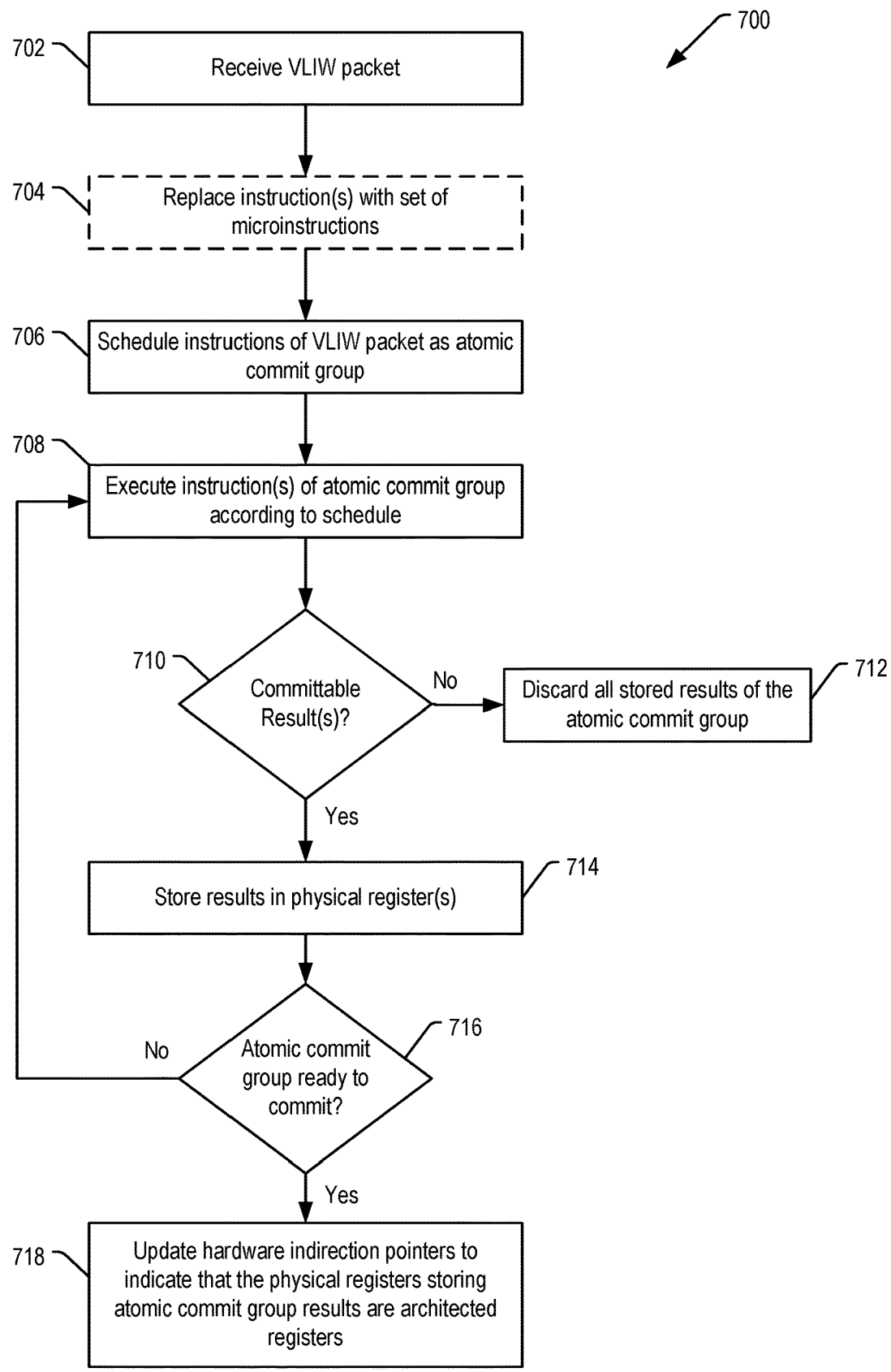
FIG. 7 is a flow chart of a particular implementation of a method of operating a processor to execute instructions of a VLIW packet during multiple time periods.

FIG. 7 depicts an example of a method 700 of operating a VLIW processor, such as the processor 100. The method 700 depicts an example of executing instructions of a VLIW packet that has a larger number of instructions than the number of execution paths of the processor.

The method 700 includes receiving a VLIW packet, at 702. The VLIW packet include multiple instructions, such as the VLIW packet 102 of FIG. 1.

In an optional implementation, one or more instructions of the VLIW packet may be replaced with a set of micro-instructions, at 704. To illustrate, the decoder 202 may be configured to access the memory 204 of FIG. 2 to replace one or more instructions of the VLIW packet with sub-instructions to generate an atomic commit group, such as the atomic commit group 220.

Instructions of the VLIW packet are scheduled as an atomic commit group, at 706. For example, the instructions of the VLIW packet (including any sub-instructions) may be scheduled by the control circuit 114, such as by the out of order scheduler 221 of FIG. 2.

One or more instructions of the atomic commit group are executed according to the schedule, at 708. For example, during the first time period 320 of FIG. 3, the first three instructions 304, 305, and 307 of the VLIW packet 102 are executed. A determination is made whether the executed instructions have generated committable results, at 710. In the event that one or more of the instructions does not generate a committable result, such as when an exception is raised, all results that have been generated as a result of execution of instructions in the atomic commit group and that have been stored in physical registers are discarded, at 712. For example, referring again to FIG. 3, if the first instruction 304 and the second instruction 305 generate committable results that are stored in physical registers of the set of physical registers 126, but the fourth instruction 307 raises an exception, the results of the first instruction 304 and the second instruction 305 may be discarded from the physical registers. For example, discarding the instruction results may include erasing the registers, overwriting the registers, or marking the registers as unused or as available for new data storage.

If all executed instructions executed at 708 are determined to have generated committable results, at 710, the results of the instructions are stored in the physical registers 126, at 714. A determination is performed, at 716, as to whether the atomic commit group is ready to commit. For example, at the end of the first time period 320 of FIG. 3, a determination may be made by the atomic commit engine 224 as to whether all instructions of the atomic commit instruction group corresponding to the VLIW packet have generated committable results. In the event that one or more of the instructions has not generated a committable result, such as prior to execution of all instructions in the VLIW packet, processing returns to 708 and one or more additional instructions of the atomic commit group are executed during a next time period (e.g., the second time period 322 or the third time period 324 of FIGS. 3-6) according to the schedule. Otherwise, when the atomic commit group is ready to commit at 716, hardware indirection pointers are updated to indicate that the physical registers storing atomic commit group results are architected registers, at 718. For example, the atomic commit engine 224 may query the status of the atomic commit group 220 of FIG. 2 to verify that all instructions and sub-instructions of the atomic commit instruction group 220 have generated committable results, and the atomic commit engine 224 may cause the register renaming circuit 134 to perform the indirection table update operation 240 to update one or more of the hardware indirection pointers 230.

Use of register renaming and atomic commit in the method 700 enables a VLIW processor to have a number of instruction execution paths that is less than the number of VLIW instructions (e.g., M<N). As a result, VLIW instructions may be executed at a reduced-cost or lower-power processor that has fewer instruction execution paths, as compared to processors having a number of execution paths that equals or exceeds the number of VLIW instructions (e.g., M≥N).

Figure 8:
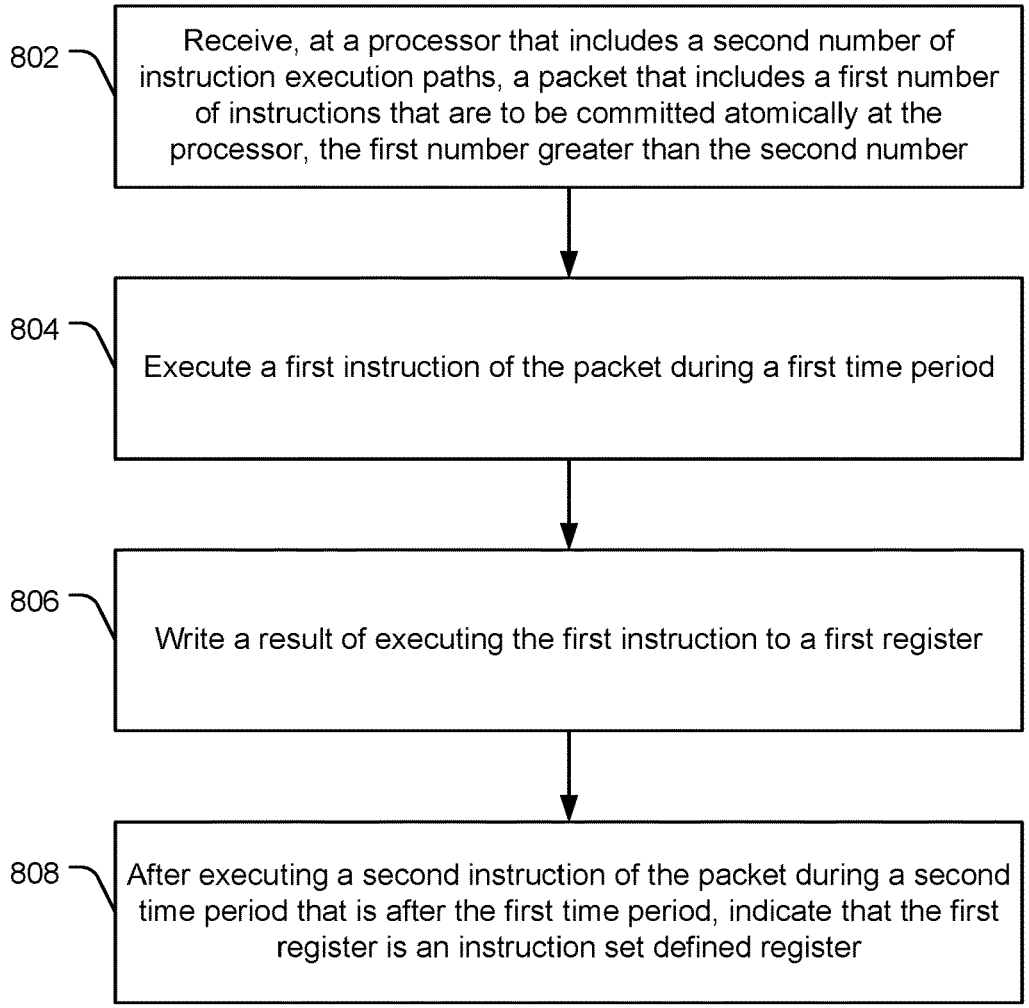
FIG. 8 is a flow chart of a particular implementation of a method of operating a processor that includes fewer execution paths than the number of instructions in a VLIW packet.

FIG. 8 depicts an example of a method 800 of operating a processor, such as the processor 100, that includes executing instructions of a VLIW packet that has a larger number of instructions than the number of execution paths of the processor.

The method 800 includes receiving, at a processor that includes a second number of instruction execution paths, a packet that includes a first number of instructions that are to be committed atomically at the processor, at 802. The first number is greater than the second number. As an illustrative example, the second number is one (e.g., the processor 100 includes a single execution path), and the first number is two or more, such as in the implementation depicted in FIG. 4. In other illustrative examples, the second number is two or greater (e.g., the processor 100 includes multiple execution paths).

A first instruction of the packet is executed during a first time period, at 804, and a result of executing the first instruction is written to a first register, at 806. In an illustrative example, the first result 163 is generated by executing the first instruction 103 and is written to one or more of the physical registers 126.

After executing a second instruction of the packet during a second time period that is after the first time period, the method 800 includes indicating that the first register is an instruction set defined register, at 808. For example, after executing the Nth instruction 105 during a time period that follows executing the first instruction 103, the register holding the first result 163 is indicated as being an architected register.

To illustrate, in some implementations, results of executing each of the instructions of the packet are stored in particular physical registers, and the results are atomically committed by updating one or more hardware indirection pointers to indicate that the particular physical registers are architected registers. In a particular implementation, indicating that the first register is an instruction set defined register includes updating a hardware indirection pointer, such as the hardware indirection pointer(s) 230. In an illustrative example, updating the hardware indirection pointer is performed as part of an indirection table update operation, such as the indirection table update operation 240, that is performed in response to determining that execution of each of the instructions has generated a committable result. The indirection table update operation includes updating multiple hardware indirection pointers to indicate that registers storing the committable results are instruction set defined registers.

In some implementations, the method 800 includes replacing an instruction of the packet with multiple sub-instructions and executing each of the multiple sub-instructions prior to indicating that the first register is an instruction set defined register. To illustrate, the decoder 202 is configured to replace the third instruction 105 with the sub-instructions 211-213 to form the atomic commit instruction group 220.

In a particular implementation, the method 800 includes receiving a second packet after receiving the packet, such as the second VLIW packet 502 of FIG. 5. The second packet includes a group of instructions that are to be committed atomically at the processor and including a third instruction. The third instruction is executed during a third time period that is before the second time period. For example, the instructions 504-506 of the second VLIW packet 502 are executed during T1 322 prior to execution, during T2 324, of the instruction 307 from the first VLIW packet 102.

By writing the result of executing the first instruction to the first register and later indicating that the first register is an instruction set defined register, the method 800 enables the processor to have the second number of instruction execution paths that is less than the first number of instructions (e.g., M<N) and to atomically commit results of execution of instructions of the packet. As a result, VLIW instructions may be executed at a reduced-cost or lower-power processor that has fewer instruction execution paths as compared to processors having a number of execution paths that equals or exceeds the number of instructions in the packet (e.g., M≥N).

Figure 9:
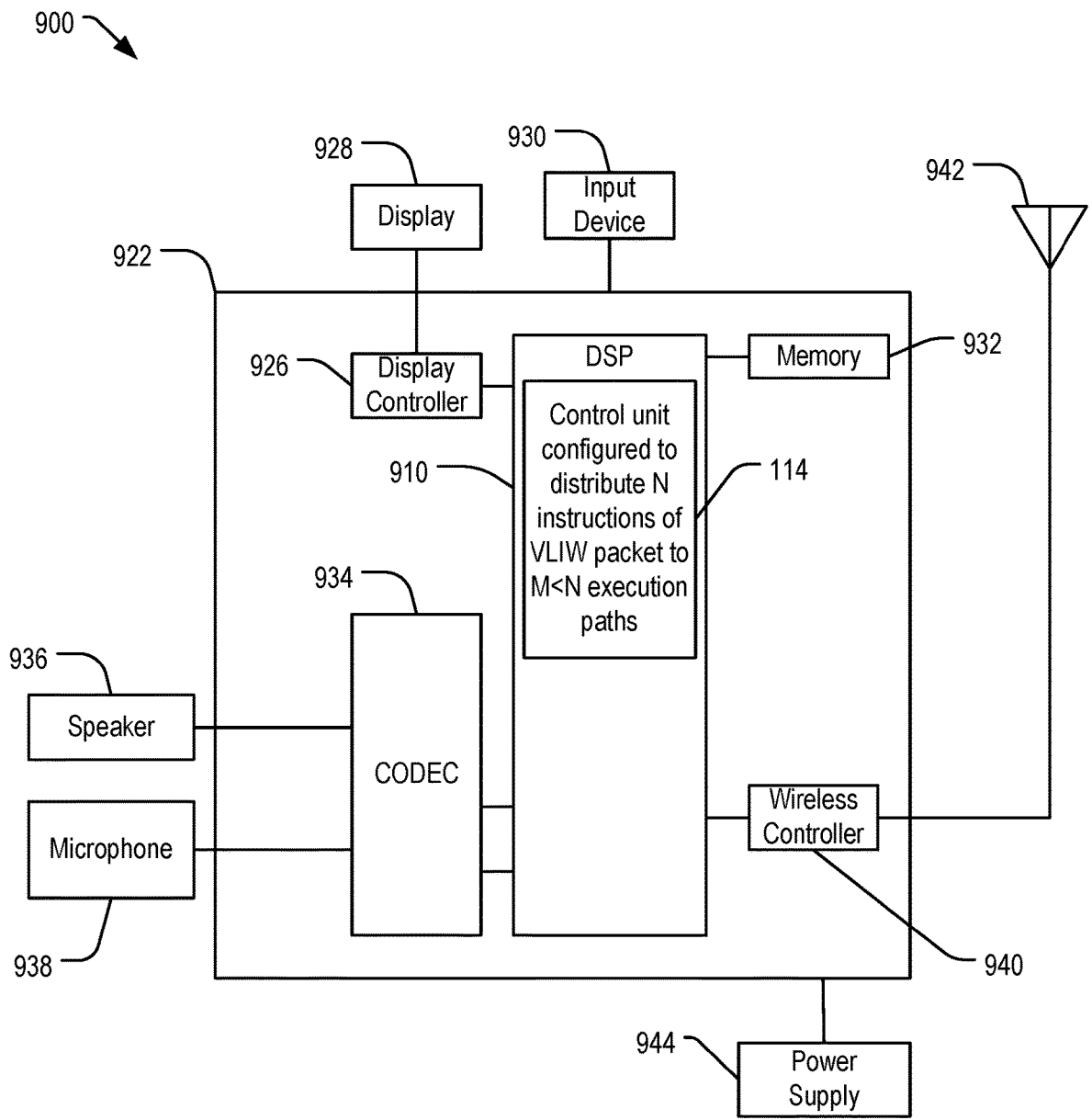
FIG. 9 is a block diagram of portable device including a processor that includes fewer execution paths than the number of instructions in a VLIW packet.

Referring to FIG. 9, a block diagram of a particular illustrative implementation of an electronic device including a processor that includes fewer execution paths than the number of instructions in a VLIW packet is depicted and generally designated 900. The electronic device 900 may correspond to a mobile device (e.g., a cellular telephone), as an illustrative example. In other implementations, the electronic device 900 may correspond to a computer (e.g., a server, a laptop computer, a tablet computer, or a desktop computer), a wearable electronic device (e.g., a personal camera, a head-mounted display, or a watch), a vehicle control system or console, a home appliance, a set top box, an entertainment unit, a navigation device, a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, another electronic device, or a combination thereof.

The device 900 includes a processor 910, such as a digital signal processor (DSP), coupled to a memory 932. In an illustrative example, the processor 910 is implemented using the VLIW processor 100 that includes the control circuit 114 of FIG. 1 that is configured to distribute N instructions of a VLIW packet to M execution paths, where M and N are positive integers, and M is less than N.

The memory 932 may be coupled to or integrated within the processor 910. The memory 932 may include random access memory (RAM), magnetoresistive random access memory (MRAM), flash memory, read-only memory (R0M), programmable read-only memory (PROM), erasable programmable read-only memory (EPROM), electrically erasable programmable read-only memory (EEPROM), one or more registers, a hard disk, a removable disk, a compact disc read-only memory (CD-ROM), another storage device, or a combination thereof. The memory 932 stores one or more instructions that are executable by the processor 910 to perform operations, such as the method 700 of FIG. 7, the method 800 of FIG. 8, or a combination thereof.

FIG. 9 also shows a display controller 926 that is coupled to the digital signal processor 910 and to a display 928. A coder/decoder (CODEC) 934 can also be coupled to the digital signal processor 910. A speaker 936 and a microphone 938 can be coupled to the CODEC 934.

FIG. 9 also indicates that a wireless controller 940 can be coupled to the processor 910 and to an antenna 942. In a particular implementation, the processor 910, the display controller 926, the memory 932, the CODEC 934, and the wireless controller 940, are included in a system-in-package or system-on-chip device 922. In a particular implementation, an input device 930 and a power supply 944 are coupled to the system-on-chip device 922. Moreover, in a particular implementation, as illustrated in FIG. 9, the display 928, the input device 930, the speaker 936, the microphone 938, the antenna 942, and the power supply 944 are external to the system-on-chip device 922. However, each of the display 928, the input device 930, the speaker 936, the microphone 938, the antenna 942, and the power supply 944 can be coupled to a component of the system-on-chip device 922, such as an interface or a controller.

The foregoing disclosed devices and functionalities, e.g., as described in reference to any one or more of FIGS. 1-9, may be designed and configured into computer files (e.g., RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above.

In connection with the disclosed examples, a non-transitory computer-readable medium (e.g., the memory 932) stores instructions that are executable by a processor (e.g., the processor 100) to perform operations. The operations include receiving a packet that includes a first number of instructions that are to be committed atomically at the processor, the first number greater than a second number of instruction execution paths of the processor. The operations also include executing a first instruction of the packet during a first time period, writing a result of executing the first instruction to a first register, and after executing a second instruction of the packet during a second time period that is after the first time period, indicating that the first register is an instruction set defined register.

In conjunction with the disclosed examples, an apparatus includes means for storing an instruction execution result. For example, the means for storing an instruction execution result may include one or more physical registers (e.g., the physical registers 126), one or more other circuits or components configured to store an instruction execution result, or any combination thereof.

The apparatus also includes means for distributing instructions of a VLIW packet to a second number of means for executing instructions. The second number is less than a first number of the instructions in the VLIW packet. For example, the means for distributing instructions of a VLIW packet may include the control circuit 114, the out of order scheduler 221, one or more other circuits or components configured to distribute instructions, or any combination thereof. The means for executing instructions may include one or more of the execution paths 170-173, one or more of the execution units 180-183, one or more other circuits or components configured to execute an instruction, or any combination thereof.

The apparatus also includes means for renaming the means for storing. For example, the means for renaming the means for storing may include the register renaming circuit 134, the renaming table 136, one or more other circuits or components configured to rename means for storing, or any combination thereof.

In some implementations, the means for renaming is further configured to atomically commit results of executing the instructions by updating one or more means for indicating to indicate that particular means for storing that store results of executing the instructions are architected means for storing. For example, the means for indicating may include the hardware indirection pointer(s) 230, one or more other circuits or components configured to indicate that means for storing are architected means for storing, or any combination thereof.

In some implementations, the apparatus includes means for replacing an instruction of the multiple instructions with multiple sub-instructions. For example, the means for replacing may include the decoder 202, the memory 204, one or more other circuits or components configured to replace an instruction with multiple sub-instructions, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Portions of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A very long instruction word (VLIW) processor comprising:
 a control circuit configured to:
  receive a VLIW packet that includes a first number of instructions; and
  schedule and route the instructions to a second number of instruction execution paths, the first number greater than the second number;
 physical registers configured to store results of executing the instructions; and
 a register renaming circuit coupled to the control circuit and configured to:
  defer committing any of the results until all of the instructions of the VLIW packet have executed successfully; and
  in response to success of execution of all of the instructions of the VLIW packet, commit the results by updating an architectural-to-physical register mapping table.

2. The VLIW processor of claim 1, wherein:
 the control circuit includes a scheduler and a tracker configured to perform instruction scheduling and tracking, respectively, and
 the register renaming circuit is configured to, after the instruction scheduling, generate an indication that a particular register of the physical registers is an instruction set defined register.

3. The VLIW processor of claim 1, wherein the control circuit is further configured to schedule a first instruction of the VLIW packet to be executed at a first execution path during a first time period and a second instruction of the VLIW packet to be executed at the first execution path during a second time period that is after the first time period.

4. The VLIW processor of claim 3, wherein the first execution path is configured to store a first committable result of execution of the first instruction in a first register of the physical registers, and wherein the register renaming circuit is configured to indicate that the first register is an architected register in response to execution of the second instruction resulting in a second committable result.

5. The VLIW processor of claim 1, further comprising a single instruction execution path, wherein the second number is one.

6. The VLIW processor of claim 1, wherein the control circuit includes an out of order scheduler, an instruction group tracker, and an atomic commit engine, and wherein the register renaming circuit is configured to atomically commit the results by updating one or more hardware indirection pointers to indicate that particular registers that store the results are architected registers.

7. The VLIW processor of claim 6, wherein the instructions in the VLIW packet form an atomic commit instruction group, and further comprising a decoder configured to increase a number of instructions in the atomic commit instruction group by replacing an instruction of the VLIW packet with multiple sub-instructions, and wherein the register renaming circuit is further configured to defer update of the one or more hardware indirection pointers until after successful execution of all of the instructions in the atomic commit instruction group.

8. A method comprising:
 receiving, at a processor that includes a second number of instruction execution paths, a packet that includes a first number of instructions that are to be committed atomically at the processor as an atomic commit instruction group, the first number greater than the second number;
 executing a first instruction of the packet during a first time period;
 writing a first result of executing the first instruction to a first register;
 executing a second instruction of the packet during a second time period that is after the first time period;
 writing a second result of executing the second instruction to a second register, wherein committing results of executing the instructions is deferred until all of the instructions of the atomic commit instruction group have executed successfully; and
 in response to determining that all of the instructions of the atomic commit instruction group have successfully executed, committing the first result and the second result by updating an architectural-to-physical register mapping table.

9. The method of claim 8, wherein committing the first result and the second result includes updating a hardware indirection pointer in the architectural-to-physical register mapping table during an indirection table update operation to indicate that the first register is an instruction set defined register.

10. The method of claim 8, further comprising:
 replacing an instruction of the atomic commit instruction group with multiple sub-instructions; and
 executing each of the multiple sub-instructions prior to indicating that the first register is an instruction set defined register.

11. The method of claim 8, further comprising:
 receiving a second packet after receiving the packet, the second packet including a group of instructions that are to be committed atomically at the processor, the group of instructions including a third instruction; and
 executing the third instruction during a third time period that is before the second time period.

12. The method of claim 8, wherein the first result and the second result are stored in particular physical registers, and the first result and the second result are atomically committed by updating one or more hardware indirection pointers of the architectural-to-physical register mapping table to indicate that the particular physical registers are architected registers.

13. An apparatus comprising:
 means for scheduling and distributing instructions of a VLIW packet to a second number of means for executing instructions, the second number less than a first number of the instructions in the VLIW packet;
 means for storing results of execution of the instructions of the VLIW packet and deferring committing the results prior to successful execution of all of the instructions of the VLIW packet; and
 means for committing the results, in response to detection that all of the instructions of the VLIW packet have executed successfully, by updating an architectural-to-physical register mapping table.

14. The apparatus of claim 13, wherein the means for scheduling and distributing is configured to schedule a first instruction of the VLIW packet for execution during a first time period and a second instruction of the VLIW packet for execution during a second time period that is after the first time period.

15. The apparatus of claim 13, wherein the instructions form an atomic commit instruction group, wherein the means for committing is configured to atomically commit results of executing the instructions by updating one or more means for indicating to indicate that particular means for storing that store results of executing the instructions are architected means for storing.

16. The apparatus of claim 15, further comprising means for increasing a number of instructions in the atomic commit instruction group by replacing an instruction of the atomic commit instruction group with multiple sub-instructions, wherein the means for committing is further configured to update the one or more means for indicating to indicate that the particular means for storing are the architected means for storing after execution of the multiple sub-instructions.

17. A non-transitory computer readable medium storing at least one instruction that, when executed by a processor, causes the processor to initiate or perform operations comprising:
   receiving a very long instruction word (VLIW) packet that includes a first number of instructions that are to be committed atomically at the processor, the first number greater than a second number of instruction execution paths of the processor;
   executing a first instruction of the VLIW packet during a first time period;
   writing a first result of executing the first instruction to a first register;
   executing a second instruction of the VLIW packet during a second time period that is after the first time period;
   writing a second result of executing the second instruction to a second register, wherein committing results of executing any of the instructions of the VLIW packet is deferred until all of the instructions of the VLIW packet have executed successfully; and
   in response to determining that all of the instructions of the VLIW packet have successfully executed, committing the first result and the second result by updating an architectural-to-physical register mapping table.

18. The non-transitory computer readable medium of claim 17, the operations further comprising:
   replacing an instruction of the VLIW packet with multiple sub-instructions; and
   executing each of the multiple sub-instructions prior to indicating that the first register is an instruction set defined register.

19. The VLIW processor of claim 1, wherein the architectural-to-physical register mapping table indicates, prior to updating the architectural-to-physical register mapping table, a first mapping of architectural registers to the physical registers, and wherein the register renaming circuit is further configured to update the architectural-to-physical register mapping table by modifying the architectural-to-physical register mapping table from the first mapping to a second mapping of the architectural registers to the physical registers.

20. The VLIW processor of claim 19, wherein the register renaming circuit is further configured to initiate, in response to a failure of execution of at least one of the instructions, a rollback of execution of each of the instructions by maintaining the first mapping of the architectural-to-physical register mapping table.

* * * * *